US009002946B2

(12) United States Patent
Evans et al.

(10) Patent No.: US 9,002,946 B2
(45) Date of Patent: Apr. 7, 2015

(54) DUAL MODELING ENVIRONMENT IN WHICH COMMANDS ARE EXECUTED CONCURRENTLY AND INDEPENDENTLY ON BOTH A LIGHT WEIGHT VERSION OF A PROXY MODULE ON A CLIENT AND A PRECISE VERSION OF THE PROXY MODULE ON A SERVER

(75) Inventors: Garrick D. Evans, San Francisco, CA (US); Yoshihito Y. Koga, Mountain View, CA (US); Michael Beale, Fremont, CA (US)

(73) Assignee: Autodesk, Inc., San Rafael, CA (US)

( * ) Notice: Subject to any disclaimer, the term of this patent is extended or adjusted under 35 U.S.C. 154(b) by 928 days.

(21) Appl. No.: 12/868,538

(22) Filed: Aug. 25, 2010

(65) Prior Publication Data

US 2012/0054261 A1 Mar. 1, 2012

(51) Int. Cl.
| G06F 15/16 | (2006.01) |
| G06F 17/50 | (2006.01) |
| G06T 15/00 | (2011.01) |
| G06F 9/54 | (2006.01) |
| H04L 29/08 | (2006.01) |
| G06F 11/20 | (2006.01) |

(52) U.S. Cl.
CPC *G06F 9/54* (2013.01); *H04L 67/04* (2013.01); *H04L 67/2804* (2013.01); *G06F 11/202* (2013.01); *G06F 11/2048* (2013.01); *G06T 15/00* (2013.01); *G06F 2209/541* (2013.01)

(58) Field of Classification Search
CPC ... G06F 9/54; G06F 2209/541; G06F 11/202; G06F 11/2048; G06T 15/00; H04L 67/2804; H04L 67/04

USPC ............... 709/203, 205, 248; 345/419; 703/1
See application file for complete search history.

(56) References Cited

U.S. PATENT DOCUMENTS

| 5,457,797 | A | * | 10/1995 | Butterworth et al. ......... 719/320 |
| 5,712,971 | A | * | 1/1998 | Stanfill et al. .................... 714/34 |
| 5,754,752 | A | * | 5/1998 | Sheh et al. ...................... 714/4.4 |
| 5,870,220 | A | * | 2/1999 | Migdal et al. ............... 359/216.1 |
| 5,938,775 | A | * | 8/1999 | Damani et al. .................. 714/15 |
| 5,941,949 | A | * | 8/1999 | Pedersen ....................... 709/227 |
| 5,956,489 | A | * | 9/1999 | San Andres et al. .......... 709/221 |
| 6,105,148 | A | * | 8/2000 | Chung et al. .................... 714/16 |
| 6,108,701 | A | * | 8/2000 | Davies et al. ................. 709/224 |
| 6,195,760 | B1 | * | 2/2001 | Chung et al. .................. 714/4.1 |
| 6,266,781 | B1 | * | 7/2001 | Chung et al. .................. 714/4.1 |
| 6,438,598 | B1 | * | 8/2002 | Pedersen ....................... 709/227 |
| 6,477,663 | B1 | * | 11/2002 | Laranjeira et al. .............. 714/11 |
| 6,581,124 | B1 | * | 6/2003 | Anand .......................... 710/305 |
| 6,622,261 | B1 | * | 9/2003 | Tien et al. ....................... 714/11 |
| 6,629,260 | B1 | * | 9/2003 | Laranjeira et al. ................ 714/3 |
| 6,694,450 | B1 | * | 2/2004 | Kidder et al. .................. 714/15 |
| 6,704,791 | B1 | * | 3/2004 | Harris ........................... 709/231 |
| 6,742,134 | B1 | * | 5/2004 | Pothier et al. ................ 714/4.12 |

(Continued)

*Primary Examiner* — Daniel C Murray
(74) *Attorney, Agent, or Firm* — Gates & Cooper LLP

(57) ABSTRACT

A method, apparatus, system, article of manufacture, and computer readable storage medium enable a dual modeling environment. A client application is created that has proxy modules. Each of the proxy modules is a light weight version of a corresponding precise module in a server application. Commands are executed in the client application to produce client output data. The same commands are transmitted to the server application that is executed concurrently with and independent from the client application and produces server output data. The client output data is synchronized with the server output data.

19 Claims, 3 Drawing Sheets

(56) References Cited

U.S. PATENT DOCUMENTS

| | | | |
|---|---|---|---|
| 6,829,723 B1* | 12/2004 | Bae | 714/11 |
| 7,035,847 B2* | 4/2006 | Brown et al. | 1/1 |
| 7,035,919 B1* | 4/2006 | Lee et al. | 709/223 |
| 7,054,637 B2* | 5/2006 | Weigand | 455/445 |
| 7,075,544 B2* | 7/2006 | Kim et al. | 345/543 |
| 7,139,821 B1* | 11/2006 | Shah et al. | 709/224 |
| 7,305,453 B2* | 12/2007 | Awamoto et al. | 709/217 |
| 7,334,014 B2* | 2/2008 | Moser et al. | 709/202 |
| 7,467,293 B2* | 12/2008 | Zhang et al. | 713/1 |
| 7,584,225 B2* | 9/2009 | Jiang et al. | 1/1 |
| 7,630,706 B2* | 12/2009 | Weigand | 455/418 |
| 7,657,517 B2* | 2/2010 | Brown et al. | 707/999.004 |
| 7,734,686 B2* | 6/2010 | Wilson et al. | 709/203 |
| 7,734,826 B2* | 6/2010 | Brown et al. | 709/248 |
| 7,818,615 B2* | 10/2010 | Krajewski et al. | 714/13 |
| 7,912,935 B2* | 3/2011 | Merissert-Coffinieres et al. | 709/223 |
| 7,930,369 B2* | 4/2011 | Marriott et al. | 709/220 |
| 8,035,636 B1* | 10/2011 | Yang | 345/419 |
| 8,041,787 B2* | 10/2011 | Isokawa et al. | 709/220 |
| 8,060,346 B2* | 11/2011 | Astolfi et al. | 703/1 |
| 8,161,154 B2* | 4/2012 | Elcock | 709/225 |
| 8,190,400 B1* | 5/2012 | Astolfi et al. | 703/1 |
| 8,200,796 B1* | 6/2012 | Margulis | 709/223 |
| 8,296,446 B2* | 10/2012 | Pedersen | 709/228 |
| 8,423,326 B1* | 4/2013 | Astolfi et al. | 703/1 |
| 8,549,107 B2* | 10/2013 | Ezerzer et al. | 709/218 |
| 8,667,066 B1* | 3/2014 | Havemose | 709/205 |
| 8,788,569 B2* | 7/2014 | Griffiths et al. | 709/202 |
| 2002/0065879 A1* | 5/2002 | Ambrose et al. | 709/203 |
| 2002/0174180 A1* | 11/2002 | Brown et al. | 709/203 |
| 2002/0194205 A1* | 12/2002 | Brown et al. | 707/200 |
| 2003/0014476 A1* | 1/2003 | Peterson | 709/203 |
| 2003/0037148 A1* | 2/2003 | Pedersen | 709/227 |
| 2003/0084165 A1* | 5/2003 | Kjellberg et al. | 709/227 |
| 2003/0187959 A1* | 10/2003 | Kim et al. | 709/219 |
| 2004/0024928 A1* | 2/2004 | Billington et al. | 710/1 |
| 2005/0070262 A1* | 3/2005 | Weigand | 455/418 |
| 2005/0165886 A1* | 7/2005 | Tuer et al. | 709/203 |
| 2006/0111095 A1* | 5/2006 | Weigand | 455/418 |
| 2006/0112150 A1* | 5/2006 | Brown et al. | 707/201 |
| 2006/0117172 A1* | 6/2006 | Zhang et al. | 713/2 |
| 2006/0168512 A1* | 7/2006 | Wilson et al. | 715/513 |
| 2006/0206562 A1* | 9/2006 | Callegari | 709/203 |
| 2006/0284867 A1* | 12/2006 | Ishikawa et al. | 345/419 |
| 2007/0008973 A1* | 1/2007 | Galea | 370/392 |
| 2008/0183841 A1* | 7/2008 | Isokawa et al. | 709/217 |
| 2008/0229234 A1* | 9/2008 | Astolfi et al. | 715/782 |
| 2009/0106432 A1* | 4/2009 | Pedersen | 709/228 |
| 2009/0177800 A1* | 7/2009 | Gidron et al. | 709/248 |
| 2009/0201303 A1* | 8/2009 | Westerhoff et al. | 345/520 |
| 2009/0300093 A1* | 12/2009 | Griffiths et al. | 709/202 |
| 2009/0323801 A1* | 12/2009 | Imajou | 375/240.01 |
| 2010/0005395 A1* | 1/2010 | Shirakawa | 715/740 |
| 2010/0077316 A1* | 3/2010 | Omansky et al. | 715/751 |
| 2010/0082734 A1* | 4/2010 | Elcock | 709/203 |
| 2010/0198718 A1* | 8/2010 | Morosan et al. | 705/37 |
| 2011/0247017 A1* | 10/2011 | Hopkins et al. | 719/328 |
| 2012/0131461 A1* | 5/2012 | Raymond et al. | 715/723 |
| 2012/0331532 A1* | 12/2012 | Walters et al. | 726/5 |
| 2013/0041939 A1* | 2/2013 | Wickman | 709/203 |
| 2013/0041980 A1* | 2/2013 | Wickman | 709/217 |
| 2013/0120367 A1* | 5/2013 | Miller et al. | 345/419 |
| 2013/0120369 A1* | 5/2013 | Miller et al. | 345/419 |
| 2013/0120378 A1* | 5/2013 | Miller et al. | 345/420 |
| 2013/0132466 A1* | 5/2013 | Miller et al. | 709/203 |
| 2013/0297676 A1* | 11/2013 | Binyamin | 709/203 |
| 2014/0109041 A1* | 4/2014 | Yunten | 717/109 |

* cited by examiner

DUAL MODELING ENVIRONMENT IN WHICH COMMANDS ARE EXECUTED CONCURRENTLY AND INDEPENDENTLY ON BOTH A LIGHT WEIGHT VERSION OF A PROXY MODULE ON A CLIENT AND A PRECISE VERSION OF THE PROXY MODULE ON A SERVER

BACKGROUND OF THE INVENTION

1. Field of the Invention

The present invention relates generally to web-enabled applications, and in particular, to a method, apparatus, and article of manufacture for executing applications in a network environment while providing a full complement of features and precision of a stand-alone application.

2. Description of the Related Art

Web-based applications are often executed on thin-client devices such as mobile telephones, personal digital assistants (PDAs), computers with limited processing capabilities, etc. However, it is desirable to build web applications that are progressively full featured and interactive while presenting results that involve precision and processing capabilities that have been traditionally relegated to stand-alone systems. Prior art systems fail to provide such web-based applications. To better understand such problems, it is useful to describe prior art web applications and their limitations.

There are two general approaches to building web applications in the prior art. In the first approach, a native web application is built using current technology (e.g., HTML [hyptertext markup language], Flash™, third party development tools, etc.). Most such web applications take advantage of a server that executes the application and performs the majority of the processing. The client computer is used to transmit commands via a user interface to the server.

In the second approach, a traditional desktop application is created and the developer determines where the application processing should be split. For example, the developer may determine that the graphics/user interface elements are processed on the client desktop window while other processing is performed by the server. Such a developer would further develop a protocol for sending command/bits/events back to the server that processes and transmits the appropriate information back to the client.

In view of the different approaches, one may see that an application can be built entirely on the browser/client that is not as precise/accurate. In other words, such an application may execute quickly but may not have the full processing capabilities of a server and hence may not provide the results desired. Thus, there is a tradeoff in the prior art between speed and accuracy.

Viewed another way, in the prior art, interactive applications are often built with a single behavioral and semantic stack. For example, user input may be accumulated, processed by various modules, executed on existing data to produce more data, followed by the updating of one or more views on the client browser. Almost always, one instance of any particular class of module (e.g., visual editing kernel, numerical solver, etc.) is used. Such prior art implementations tend to only have the capacity to scale, in terms of the manipulate-compute-display response profile, as a function of computation resources upon which the application runs/executes. In other words, as the resources increase with respect to memory, processing cores, faster processors, etc., better performance may be achieved.

The corollary to this statement is that by "reducing data" to those algorithms that are sensitive to it, performance can be increased as well. For example, if coarser meshes are used for analysis, less triangles and effects result for the display, and larger error tolerances for solvers may result.

Such conditions may be exacerbated when moving these application architectures to client/server and other distributed models. Further, when the client-side environment is in some way more constrained (i.e., less computations result in less capabilities), decisions must be made with respect to the interactive experience/performance versus fidelity and accuracy of the data.

In view of the above, it is desirable to provide an application architecture that enables new mechanisms for scalability and the means to improve interactivity with less compromise on the fidelity of the data. It is further desirable to enable the development and delivery of real interactive three dimensional (3D) editing and design applications on the web and mobile devices.

SUMMARY OF THE INVENTION

One or more embodiments of the invention overcome the problems of the prior art by providing a dual modeling environment. Lightweight versions of an application's modules are created. The lightweight modules are executed on a client computer concurrently with the full/more precise version of the modules on a server computer. The lightweight modules enable the user to view results quickly but without the high fidelity required/needed for final output results.

To ensure accurate final output data, the client output data is synchronized with the server output data. Such synchronization may occur without reconciling any data, by reconciling after the execution of every command on the server, or at any level in between. The timing of the reconciliation/synchronization process may also be determined/specified by the user (e.g., after an accuracy threshold has been exceeded, every five minutes, never, etc.).

Accordingly, the dual modeling framework enables developers to design mobile and web applications that provide both speed and fidelity within the same application session while utilizing a dynamic mechanism to synchronize data between concurrently executing modules on a client and server.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
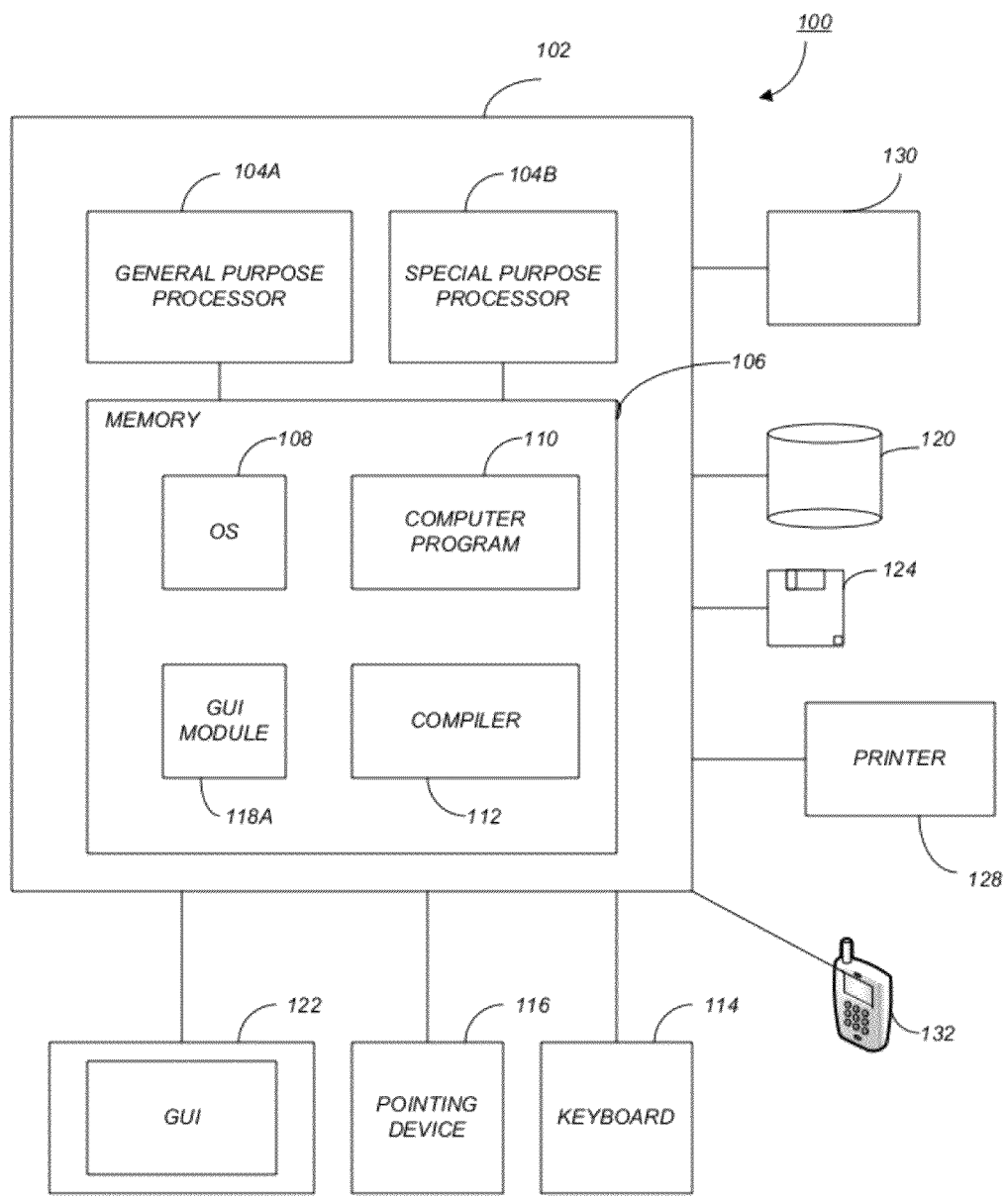
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to other devices, including input/output (I/O) devices such as a keyboard 114, a cursor control device 116 (e.g., a mouse, a pointing device, pen and tablet, etc.) and a printer 128. In one or more embodiments, computer 102 may be coupled to a thin client device 132 (e.g., an MP3 player, iPod™, Nook™, portable digital video player, cellular device, personal digital assistant, etc.). Such a device often has limited capabilities in terms of processing, display, and/or memory. However, any type of thin client device 132 may be used in accordance with embodiments of the invention (including devices with capabilities similar to that of computer 102).

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108 to provide output and results.

Output/results may be presented on the display 122 or provided to another device for presentation or further processing or action. In one embodiment, the display 122 comprises a liquid crystal display (LCD) having a plurality of separately addressable liquid crystals. Each liquid crystal of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors.

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 which allows an application program 110 written in a programming language such as COBOL, Pascal, C++, FORTRAN, or other language to be translated into processor 104 readable code. After completion, the application or computer program 110 accesses and manipulates data accepted from I/O devices and stored in the memory 106 of the computer 102 using the relationships and logic that was generated using the compiler 112.

The computer 102 also optionally comprises an external communication device such as a modem, satellite link, Ethernet card, or other device for accepting input from and providing output to other computers 102.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, causes the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 102.

Although the term "user computer" or "client computer" is referred to herein, it is understood that a user computer 102 may include portable devices such as cellular phones, notebook computers, pocket computers, or any other device with suitable processing, communication, and input/output capability.

Figure 2:
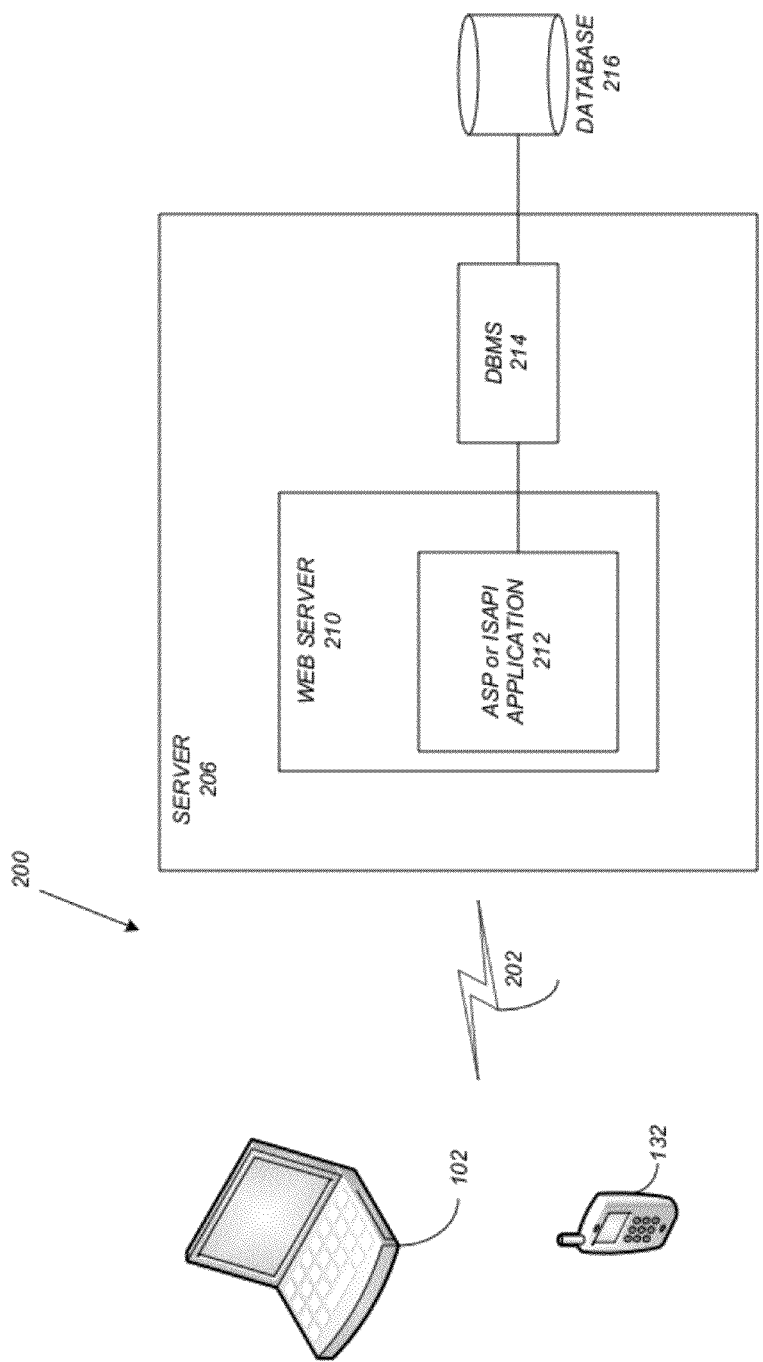
FIG. 2 schematically illustrates a typical distributed computer system using a network to connect client computers to server computers in accordance with one or more embodiments of the invention.

FIG. 2 schematically illustrates a typical distributed computer system 200 using a network 202 to connect client computers 102 to server computers 206. As used herein, client devices 102 include thin client devices 132 and/or similar peripherals as described above. A typical combination of resources may include a network 202 comprising the Internet, LANs (local area networks), WANs (wide area networks), SNA (systems network architecture) networks, or the like, clients 102 that are personal computers or workstations and servers 206 that are personal computers, workstations, minicomputers, or mainframes (as set forth in FIG. 1).

A network 202 such as the Internet connects clients 102 and/or thin client devices 132 to server computers 206. Network 202 may utilize ethernet, coaxial cable, wireless communications, radio frequency (RF), a cellular network, etc. to connect and provide the communication between clients 102, thin client devices 132 and servers 206. Clients 102 (including thin client devices 132) may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, etc. Further, the software executing on clients 102/thin client devices 132 may be downloaded from server computer 206 to client computers 102 and installed as a plug in or ACTIVEX™ control of a web browser. Accordingly, clients 102 may utilize ACTIVEX™ components/component object model (COM) or distributed COM (DCOM) components to provide a user interface on a display of client 102. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of or connected directly to client 102 instead of communicating/obtaining the information from database 216 across network 202. When a developer encapsulates the business functionality into objects, the system may be referred to as a COM system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

As an alternative to the above, different computing environments may also be used in accordance with embodiments of the invention. For example, a Linux™ or other operating system and corresponding components may be utilized.

Generally, these components 100-218 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the term "user computer", "client computer", "thin client device 132" and/or "server computer" is referred to herein, it is understood that such computers 102 and 206 and thin client devices 132 may include portable devices such as cellular phones, notebook computers, pocket computers, personal digital assistants, or any other device with suitable processing, communication, and input/output capability.

Of course, those skilled in the art will recognize that any combination of the above components, or any number of different components, peripherals, and other devices, may be used with computers 102 and 206 and thin client devices 132.

Software Embodiments

Embodiments of the invention are implemented as a software application on a client 102, thin client device 132, and/or server computer 206. As described above, it is desirable to enable a fast application on a client/browser 102 while also enabling the numerical precision desired in such an application. Further, it is desirable to provide interactive capabilities on a browser/client application that looks and feels like a native application (e.g., an application executing on a stand-alone computer). However, when an application is designed, the capabilities of the client/browser 102 are unknown at design time (i.e., the developer may not know the capacity or processing capabilities of the thin client device 132). Similarly, it is undesirable to implement all operations on a server with the result presented to the user on a client/mobile device 102 because such results would not be acceptable in terms of speed (and potentially the graphics limitations may present conflicts) (i.e., transmission limitations may exist and the results may be processed more slowly on the server due to the level of precision/fidelity of the data). Consequently, it is desirable to provide a hybrid model that utilizes both the client 102 and server 206.

Hybrid Model Overview

To provide a hybrid model, an application may be viewed as a series of modules/chunks of code. One module performs an operation and passes results to a different module. In one or more embodiments of the invention, the different modules/functionalities are duplicated on both the client 102 and server 206. Thus, embodiments may have two different modules performing the same job—(1) client-based module performed very rapidly (without the resource constraints but may not provide results that are visually appealing); and (2) a server-based module that enables the full processing of the modules (including the numerical precision desired).

The different modules executing on the client 102 and server 206 offer different experiences to an end user/developer. For example, a module executing on a client 102 may not look visually appealing but may still provide a satisfying experience. Further, the client-based module may synchronize itself with the second server-based module. In this regard, the application may be designed to execute entirely on a client/browser 102 that is not as accurate but fast (i.e., executes quickly). All commands and processes provided to the client-based module are backed up to a matching module on the server where the real information (i.e., numerically precise data) is processed.

Once the data is processed on both the client 102 and server 206, embodiments of the invention enable the synchronization of the different modules. Such synchronization is necessary due to functional differences and potential mathematical errors that may occur in a trivial or significant manner (i.e., on the client 102). The synchronization in accordance with embodiments of the invention allows the server 206 to correct the client 102 or notify the client 102 that a threshold difference is being exceeded. In other words, the problem/notification of the problem may be pushed from the server 206 to the client 102 where the problem may be corrected.

An exemplary environment for utilizing such a dual modeling environment (where modules are executed on both the client 102 and server 206), exists in a solid modeling application. For example, a circle may be sketched/drawn and an extrusion performed thereby creating a cylinder. Locally, in the browser 110 on the client 102, the math may be performed, triangles generated, and instructions provided to draw the cylinder. At the same time, the sketch/draw circle and extrusion command are transmitted to the server 206 where a more powerful and complete solid modeling engine may be used to the compute the information. Thus, the real and more accurate data exists on the server 206 while a modified version (that may involve various shortcuts to expedite the processing) is performed on the client 102. In this regard, due to the content and actions used to create the modified version, such a modified version may not be stable and does not include the details from the full version that exists on the server 206.

In another example, if modeling a constraint system with many moving parts (e.g., a box on a conveyor belt or spheres rolling on a floor), a simple physics engine may exist on the client. Such a simple engine may include some randomness and other influences to expedite the processing, properties that do not exist on the server-based version. Such randomness and other influences on the client 102 likely result in errors that can accumulate over time. Once a defined period of time has passed or once an error threshold has been exceed, the server 206 may transmit corrections to update the data on the client 102. Accordingly, the user on the client 102 can continue to work without paying the cost for the high fidelity and more precise engine calculations that are being performed on the server 206.

Accordingly, the multiple implementations of the functional modules/engines are synchronized over a network/distribution channel 202 to provide a richer functional experience on the mobile web client 102 without sacrificing precision and the accuracy of the data. The timing of the synchronization may be configured by the user. For example, any errors may be constantly transmitted from the server 206 to the client 102 once determined. Alternatively, such updates can be delayed if the errors may not impair the user's activities. In this regard, different synchronization protocols/timing may be utilized depending on the activity and content of the modules being executed. As a result, the code executing on the client may be far lighter and have less restrictions (with regards to resources and capacity required) compared to that of a full desktop application.

Hybrid Model Details

In general, the invention is the idea that the "linear" application stack described above is not always required and that applications 110 can be constructed with pairs of proxy and precise modules with synchronization and correction semantics.

Specifically, for web applications, embodiments of the invention provide a system where functionality is duplicated both on the client 102 and the server 206 at a module level. On the client 102, a fast, approximating component is used to deliver the desired interactivity. On the server 206, a numerically precise "slower" component resides and receives the exact same command set (as that received on the client 102).

The next piece of the architecture is the mechanism that synchronizes the client module with the server module to correct accumulated errors. The application can thus be tuned (synchronization frequency), module-by-module to obtain a desirable mix of interactivity and visual appeal. The data that is ultimately the output of the application always comes from the accurate server model; the client-side data is always considered transient.

One exemplary implementation is that of an interactive 3D solid modeling application. Such an application may be composed of two modeling kernels: a modeler kernel (referred to herein as "AModeler") runs in the context of a browser plug-in and a shape manager kernel (e.g., ASM™—Autodesk™ Shape Manager available from the assignee of the present invention) runs on the server 206.

The client component is lightweight and fast for certain data sets and operations and thus can be used as a proxy for the high quality representation (the "real data" in the cloud/server 206). The application framework manages the collection and dispatch of commands, say in this particular case modifiers, along the kernel bus so that the AModeler responds locally and ASM processes them concurrently, remotely. Basically, this enables each module to process the modifiers independently to any (different) degree of accuracy.

Additionally, certain "tricks" can be employed in the local module (i.e., client module) to improve interactivity such as reducing tesselation refinement during direct manipulations and operations. For example, on a "mouse-up" command received from the user, the local environment can be updated or synchronized from the server 206 that will not be engaged in the lower fidelity computation.

As previously noted, the synchronization points can be tuned between the following extremes: (1) the result of each command is reconciled from the server 206 (most accurate local representation); to (2) no synchronization is performed and the local proxy is always used (for visual feedback).

Another corollary to the invention is the notion of gracefully handling semantic synchronization errors. These are errors that occur when the capabilities of the two modules are different enough that a non-trivial, non-recoverable modeling error would result if allowed to complete. A simple example can be thought of in terms of the numerical precision differences between the local proxy (i.e., on client 102) and server module. An operation might appear to "succeed" locally but when processed by the precise kernel, in fact violates a region of numerical stability. A more complicated example might be when one or more modifiers that produce a "valid" result locally cannot actually be performed with integrity on the server.

To manage the above-identified situations, an application framework (of embodiments of the invention) marks commands (or sets of commands) not unlike the notion of a transaction (though these are not transactions). The framework on the client 102 side will manage a stack of these command sets that will continue to grow until each is acknowledged by the server side 206 of the framework. This can happen via a full synchronization (including data) or a simple ACK (acknowledge command). As the server 206 processes the same commands it can inform the framework as to their success/validity.

If an error occurs, the client 102 is informed and can immediately identify the user. Since the client 102 maintains the stack of unconfirmed commands available, the client 102 can not only return to the last stable state but can also "play back" the steps that produced the error. Armed with this data, embodiments of the invention can (1) provide useful visual feedback to the user; (2) use exact data from the server 206 to constrain (the operators in) the local environment to guide the operators to a real solution; (3) automatically reduce the synchronization times to provide accurate (though slower) realtime feedback in the tools; and/or (4) improve the local kernel, the protocol, and the system in general (offline).

Another aspect of the invention involves more complex manipulations and computationally more expensive operations, such as constraints. In a local environment where speed is important, these computations may not be calculated with as much accuracy as the user desires. Errors will eventually accumulate and correction will be required. This is not the case for a scene in the cloud where computation power is not limited. When computation power is not limited, calculations are performed with accuracy and saved. In further embodiments of the invention, once an accuracy threshold is exceeded in the local environment, the model from the cloud is retrieved, correcting the accuracy issues.

Logical Flow

Figure 3:
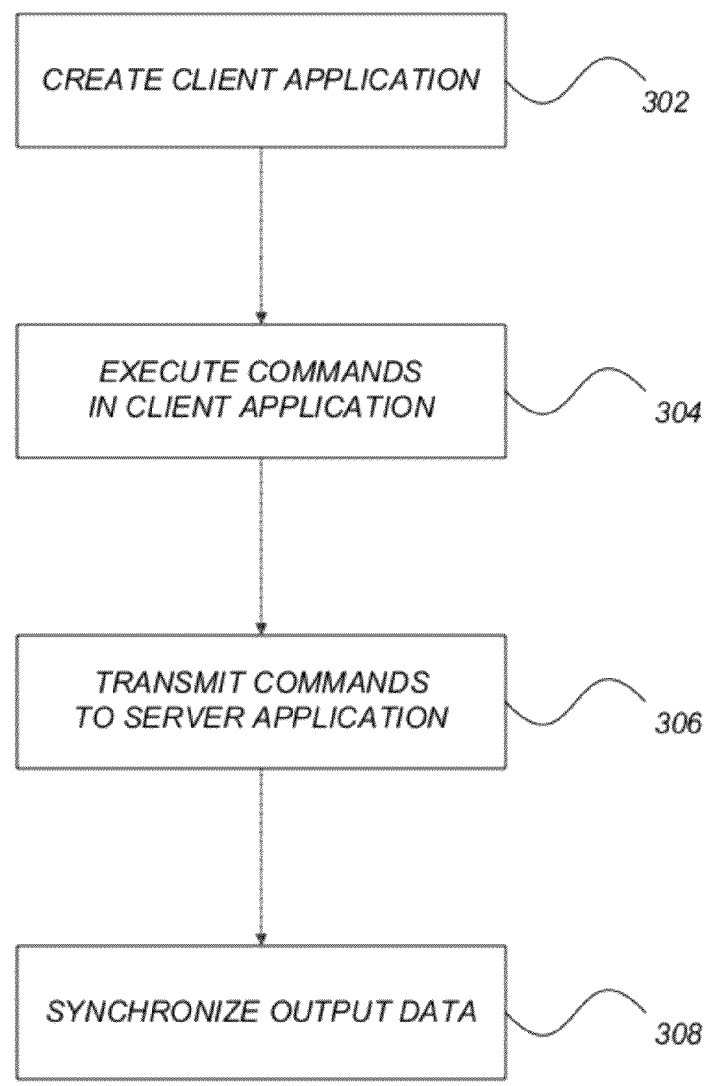
FIG. 3 is a flow chart illustrating the logical flow for enabling a dual modeling environment in accordance with one or more embodiments of the invention.

FIG. 3 is a flow chart illustrating the logical flow for enabling a dual modeling environment in accordance with one or more embodiments of the invention. At step 302, a client application is created that has one or more proxy modules. Each of the proxy modules is a lightweight version of a corresponding precise module of a server application. The client application may be executed as a web-browser plug-in and may further consist of low fidelity computations compared to that of the server application modules. Further, the server modules and client modules are both part of the same application session.

At step 304, one or more commands (e.g., received from a user) are executed in the client application to produce client output data. The client output data may provide interactivity to a user of the client application and may further consist of transient (i.e., non-permanent) data.

At step 306, the same one or more commands are transmitted to the server application that is configured to utilize the commands during execution. The server application executes the commands concurrently with and independent from the client application to produce server output data (while being part of the same application session).

At step 308, the client output data is synchronized with the server output data. The synchronization process may be performed a variety of ways. In one or more embodiments, a level of synchronization is selected (e.g., by the user). The level selected may lie between (or at the endpoints of) two extremes. On one end, the server output data (produced from the execution of each and every one of the commands from the server application) is reconciled with the client output data (i.e., all updates may be performed in real-time once a command's execution has completed on the server). On the other end, the synchronization process may entail utilizing the client output data without reconciling with the server output data at all (i.e., the client output data is used and no updates/reconciliation are needed/performed).

In an alternative embodiment, the synchronization process maintains a client command stack consisting of a subset of the commands. The subset includes (and may only include) those commands that would result in a modeling error if allowed to complete execution in the server application. The client command stack would continue to grow until each command in the stack is acknowledged by the server application (as described above).

In an additional embodiment, the synchronization process may include determining, in the client application, when an accuracy threshold has been reached. Such an accuracy threshold may be a threshold based on an accuracy of the execution of the commands in the client application. Once the threshold has been reached, the server output data may be retrieved (e.g., pulled or pushed) from the server and reconciled with the client output data. In other words, errors (in the accuracy as determined by the client or server) may accumulate until a threshold level has been reached, at which point, the reconciliation process may initiate. The commencement of the reconciliation process may be initiated by the client/user or may occur automatically without any additional user input.

In view of the above, the dual modeling environment provides for dual execution on both the client (of a lightweight module) and the server (of a more precise module) that occur concurrently and independently from each other. The client based modules allow the user to view data quickly but may lack the fidelity of a more complete server based module. Accordingly, the client based data and server based data are eventually synchronized with each other to produce both visually appealing and precise output data to the user.

The development of the different modules may be performed by a developer when creating the application to be executed. Alternatively, a modeling environment of the invention may automatically create (i.e., without additional user input) the lightweight client version of the modules based on the complete server modules (or vice versa). In an automated environment, the functions to be performed by the client modules may strictly include visual data. In this regard, such a modeling environment may analyze the details needed to produce a visually appealing result on the client application and extract such functionality from the server module to produce the client module.

In one or more embodiments, a set of criteria may be utilized to determine the level of detail incorporated into each module. For example, a frame rate requirement may be established. If the frame rate cannot be maintained by the client version of the module, the server may perform some of the rendering/painting. The application developer/author may make the determination and establish the requirements for performing the various levels of detail set forth in the lightweight client version of the modules. Accordingly, different modules may be utilized for different capacities/platforms. The appropriate platform may be selected (either dynamically at runtime or in advance by a developer) based on a client's processing capabilities (that may also be determined dynamically at runtime). Such a dynamic determination and utilization of a particular client version of a module may be performed automatically without additional user/developer input. Embodiments of the invention are not intended to be limited by the method used to identify the functionality used in a client lightweight module but is limited by the claims specified herein.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide for more than one component (e.g., client and server) performing the same job with different levels of precision and speed in distributed applications to enable a more viable and modern approach to developing interactive design on the web and on mobile devices, the latter particularly being more highly resource constrained. In other words, embodiments of the invention enable maintaining dual modeling environments of the same data, within the context of the same application session, that can change at different rates. Further, embodiments provide, in an interactive distributed application, a dynamic mechanism to synchronize visual and numerical data, provide tunable error correction as well as error detection and dynamic user feedback and guidance.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for enabling a dual modeling environment, comprising:
    (a) creating a client application comprising one or more proxy modules, wherein:
        (i) each of the one or more proxy modules corresponds to a precise module;
        (ii) each of the one or more proxy modules comprises a light weight version of the corresponding precise modules; and
        (iii) a server application is comprised of one or more precise modules;
    (b) executing one or more commands in the one or more proxy modules in the client application to produce client output data;

(c) transmitting the same one or more commands to the server application that is configured to utilize the same one or more commands during execution of the one or more precise modules, wherein the server application is configured to execute the same one or more commands in the server application concurrently with and independent from the client application to produce server output data; and (d) synchronizing the client output data with the server output data, wherein the synchronizing comprises:
  (i) maintaining a client command stack comprised of a subset of the one or more commands, wherein:
    (1) the subset comprises those commands that would result in a modeling error if allowed to complete execution in the server application; and
    (2) the client command stack continues to grow until each command in the stack is acknowledged by the server application; and
  (ii) utilizing stack data that is based on the one or more commands in the client command stack that have not been acknowledged by the server application.

2. The computer-implemented method of claim 1, wherein the client application is executed as a web browser plug-in.

3. The computer-implemented method of claim 1, wherein the client application comprises lower fidelity computations compared to that of the server application.

4. The computer-implemented method of claim 1, wherein:
the client output data provides interactivity to a user of the client application and comprises transient data; and
the one or more precise modules produce numerically precise server output data.

5. The computer-implemented method of claim 1, wherein the synchronizing comprises selecting a level of synchronization between:
reconciling the server output data, produced from the execution of each and every one of the one or more commands from the server application, with the client output data produced from the execution of the one or more commands in the client application; and
utilizing the client output data without reconciling the client output data and the server output data.

6. The computer-implemented method of claim 1, wherein the synchronizing comprises:
determining, in the client application, when an accuracy threshold has been reached, wherein the accuracy threshold comprises a threshold based on an accuracy of the execution of the one or more commands in the client application; and
when the accuracy threshold has been reached, retrieving the server output data from the server and reconciling the client output data based on the server output data.

7. The computer-implemented method of claim 1, wherein the client application and server application comprise three-dimensional (3D) modeling applications.

8. An apparatus for enabling a dual modeling environment in a computer system comprising:
(a) a client computer having a memory;
(b) a client application executing on the client computer, wherein:
  (i) the client application comprises one or more proxy modules;
  (ii) each of the one or more proxy modules corresponds to a precise module executing on a server computer;
  (iii) each of the one or more proxy modules comprises a light weight version of the corresponding precise module; and
  (iv) a server application is comprised of one or more precise modules;
  (v) the client application is configured to:
    (1) execute one or more commands in the one or more proxy modules to produce client output data;
    (2) transmit the same one or more commands to the server application that is configured to utilize the same one or more commands during execution of the one or more precise modules, wherein the server application is configured to execute the same one or more commands in the server application concurrently with and independent from the client application to produce server output data; and
    (3) synchronize the client output data with the server output data, wherein the client application is configured to synchronize by:
      (A) maintaining a client command stack comprised of a subset of the one or more commands, wherein:
        (i) the subset comprises those commands that would result in a modeling error if allowed to complete execution in the server application; and
        (ii) the client command stack continues to grow until each command in the stack is acknowledged by the server application; and
      (B) utilizing stack data that is based on the one or more commands in the client command stack that have not been acknowledged by the server application.

9. The apparatus of claim 8, wherein the client application is executed as a web browser plug-in.

10. The apparatus of claim 8, wherein the client application comprises lower fidelity computations compared to that of the server application.

11. The apparatus of claim 8, wherein:
the client output data provides interactivity to a user of the client application and comprises transient data; and
the one or more precise modules produce numerically precise server output data.

12. The apparatus of claim 8, wherein the client application is configured to synchronize by selecting a level of synchronization between:
reconciling the server output data, produced from the execution of each and every one of the one or more commands from the server application, with the client output data produced from the execution of the one or more commands in the client application; and
utilizing the client output data without reconciling the client output data and the server output data.

13. The apparatus of claim 8, wherein the client application is configured to synchronize by:
determining, in the client application, when an accuracy threshold has been reached, wherein the accuracy threshold comprises a threshold based on an accuracy of the execution of the one or more commands in the client application; and
when the accuracy threshold has been reached, retrieving the server output data from the server and reconciling the client output data based on the server output data.

14. A non-transitory computer readable storage medium encoded with computer program instructions which when accessed by a client computer cause the client computer to load the program instructions to a memory therein creating a special purpose data structure causing the client computer to operate as a specially programmed client computer, executing a method of enabling a dual modeling environment, comprising:

(a) creating, in the specially programmed client computer, a client application comprising one or more proxy modules, wherein:
   (i) each of the one or more proxy modules corresponds to a precise module;
   (ii) each of the one or more proxy modules comprises a light weight version of the corresponding precise module; and
   (iii) a server application is comprised of one or more precise modules;

(b) executing, in the specially programmed client computer, one or more commands in the one or more proxy modules in the client application to produce client output data;

(c) transmitting, in the specially programmed client computer, the same one or more commands to the server application that is configured to utilize the same one or more commands during execution of the one or more precise modules, wherein the server application is configured to execute the same one or more commands in the server application concurrently with and independent from the client application to produce server output data; and (d) synchronizing, in the specially programmed client computer, the client output data with the server output data, wherein the synchronizing comprises:
   (i) maintaining a client command stack comprised of a subset of the one or more commands, wherein:
      (1) the subset comprises those commands that would result in a modeling error if allowed to complete execution in the server application; and
      (2) the client command stack continues to grow until each command in the stack is acknowledged by the server application; and
   (ii) utilizing stack data that is based on the one or more commands in the client command stack that have not been acknowledged by the server application.

15. The non-transitory computer readable storage medium of claim 14, wherein the client application is executed as a web browser plug-in.

16. The non-transitory computer readable storage medium of claim 14, wherein the client application comprises lower fidelity computations compared to that of the server application.

17. The non-transitory computer readable storage medium of claim 14, wherein:
   the client output data provides interactivity to a user of the client application and comprises transient data; and
   the one or more precise modules produce numerically precise server output data.

18. The non-transitory computer readable storage medium of claim 14, wherein the synchronizing comprises selecting a level of synchronization between:
   reconciling the server output data, produced from the execution of each and every one of the one or more commands from the server application, with the client output data produced from the execution of the one or more commands in the client application; and
   utilizing the client output data without reconciling the client output data and the server output data.

19. The non-transitory computer readable storage medium of claim 14, wherein the synchronizing comprises:
   determining, in the client application, when an accuracy threshold has been reached, wherein the accuracy threshold comprises a threshold based on an accuracy of the execution of the one or more commands in the client application; and
   when the accuracy threshold has been reached, retrieving the server output data from the server and reconciling the client output data based on the server output data.

* * * * *